United States Patent [19]

Bieganski

[11] Patent Number: 5,187,833
[45] Date of Patent: Feb. 23, 1993

[54] SOLDER REMOVAL TOOLS

[75] Inventor: Zdzislaw Bieganski, Harpenden, England

[73] Assignee: ZB New Products Limited, United Kingdom

[21] Appl. No.: 807,234

[22] Filed: Dec. 16, 1991

[30] Foreign Application Priority Data

Jan. 17, 1991 [GB] United Kingdom ................. 9101060
Feb. 2, 1991 [GB] United Kingdom ................. 9102278

[51] Int. Cl.⁵ .............................................. A47L 5/04
[52] U.S. Cl. ....................................... 15/341; 15/421; 228/20
[58] Field of Search .................... 228/20; 15/341, 344, 15/421

[56] References Cited

U.S. PATENT DOCUMENTS 3,862,468  1/1975  Fortune ................................. 228/20
5,081,739  1/1992  Kao ...................................... 15/341

FOREIGN PATENT DOCUMENTS 0170377  2/1986  European Pat. Off. .
2907421  8/1980  Fed. Rep. of Germany ........ 228/20
1448002  6/1966  France .................................. 15/341
 995949  6/1965  United Kingdom .
1462585  6/1977  United Kingdom .
1481030  7/1977  United Kingdom .
2036187  6/1980  United Kingdom .

Primary Examiner—Richard K. Seidel
Assistant Examiner—Jeanne M. Elpel
Attorney, Agent, or Firm—Learman & McCulloch

[57] ABSTRACT

A suction pump for removing molten solder having a piston spring driven away from the nozzle so as to induce a vacuum and draw molten solder into the barrel. The stroke of the barrel is controlled by a detent including a cross-pin 19 which can be selectively engaged with any one of a series of notches in the piston rod, so that the length of the spring driven stroke depends upon which notch was engaged when the detent is released.

15 Claims, 1 Drawing Sheet

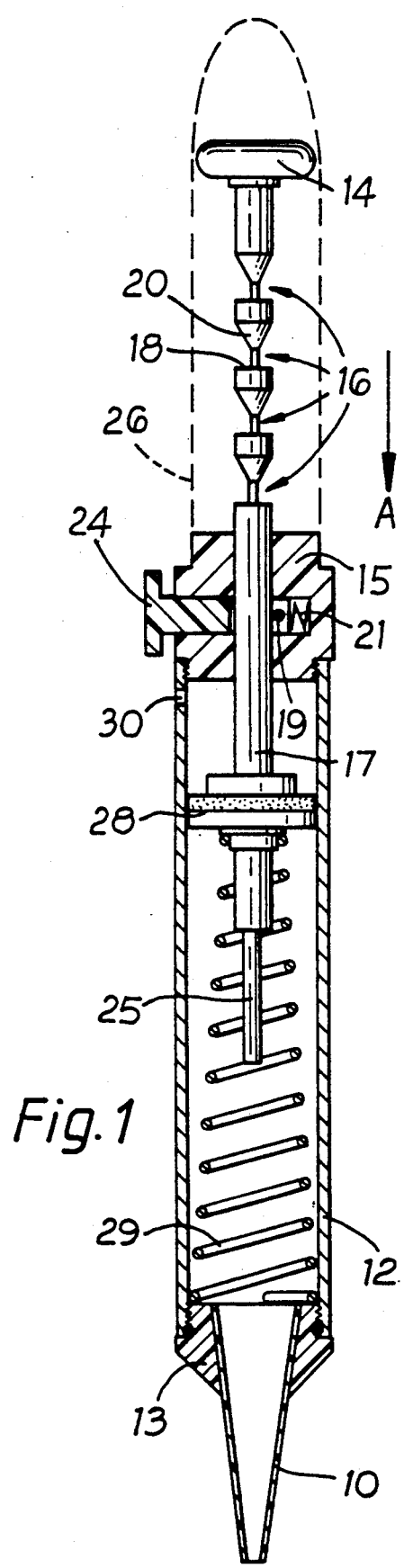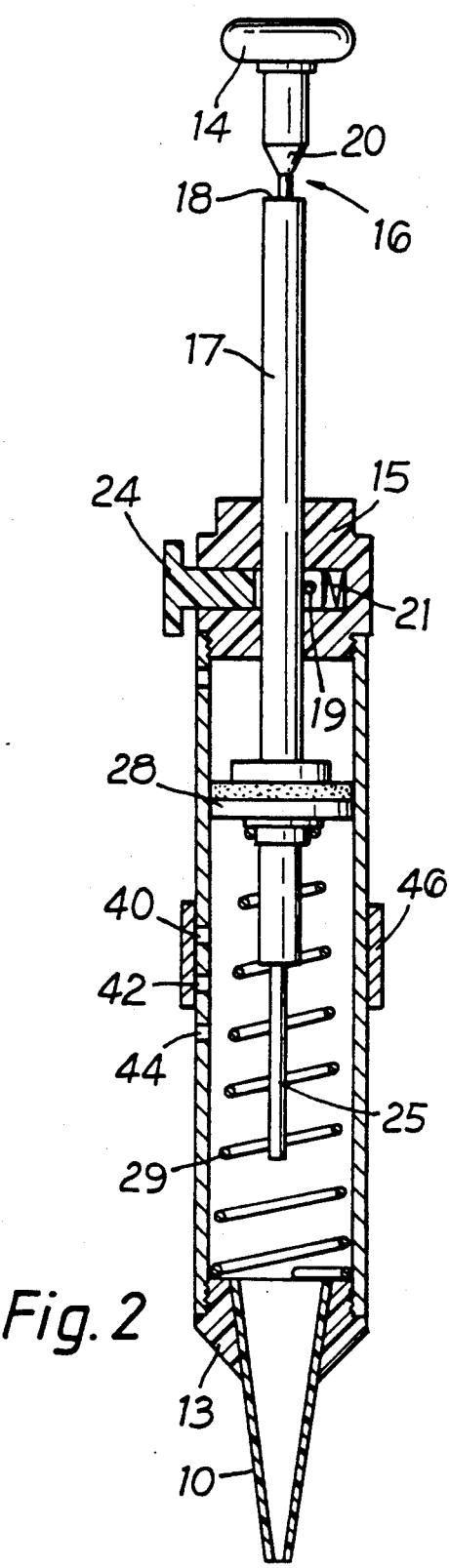

SOLDER REMOVAL TOOLS

This invention relates to tools for removing molten solder for example from printed circuit boards in their manufacture. The industry standard tool is a suction pump, that is a cylinder barrel housing a piston, having a nozzle at one end. The piston is spring-urged away from the nozzle and held against the spring by a releasable latch for example one extending transversely of the rod. Release of the latch allows the vacuum induced by the spring-driven piston travel to suck the solder into the barrel through the nozzle. The piston is returned manually for automatic re-engagement of the latching readiness for a repeat operation.

These tools are made in a range of sized differing in diameter and stroke (travel of the piston) and also differing in the length of the spring used, so as to have different suction effects according to the likely quantity of solder to be removed on each operation. An operator may need a number of tools, for example three different ones, to suit differing needs.

The objects of the invention is to simplify the design so as to enable a single tool to be made to suit the range of needs.

According to the intention considered broadly, means are provided to vary the value of the suction afforded by each operation.

To provide a tool adjustable by the user, it is presently preferred to arrange for the latching means to be engageable in any selected one of a number of positions along the piston rod. Hence to set the tool for minimum suction after a previous operation the rod is displaced towards the nozzle for a minimum distance until the first engaged position is reached. Release of the latch then results in a short travel of the piston relatively low suction value. For a relatively high degree of suction, the rod is displaced further to a second further displaced position and so on.

To provide a tool which is adjustable for example by the manufacturer, one possibility is to use a fixed stroke of the piston and to drill a vacuum release or exhaust port at any of a range of positions along the barrel according to the desired effect. For a low vacuum or suction value the port will be drilled near to the nozzle, and vice versa. In a variation of this possibility the barrel is pre-drilled with a plurality of such exhaust ports or holes, and the barrel is enclosed in a sleeve or outer barrel which is longitudinally positioned so as to close off all but the required port or ports, and can be moved by the user to suit requirements.

Two embodiments of the invention are now more particularly described with reference to the accompanying drawings wherein:

FIG. 1 is a sectional elevation of an adjustable stroke tool; and

FIG. 2 is a like view of an adjustable effective-stroke tool.

Turning first to FIG. 1, the tool comprises cylinder barrel 12 having a closure plug 13 at one end carrying a nozzle 10. At the other end a second plug 15 provides a sliding guidance for piston rod 17 and mounts a radially displaceable latch member 24 which is bifurcated to have limbs on either side of the rod 17 together with a cross-pin 19 spanning the limbs. A soft spring 21 urges the latch member to take the cross-pin towards the rod.

The piston rod has four (in this instance) reduced diameter portions or notches 16 each of the upper three of which extends stop face 18 towards a cam conveniently in the form of a frusto-conical surface 20. A short length of full diameter of the rod 17 conveniently extends from each cone to the next stop face. The rod terminates in operating knob 14.

The piston rod also has a pin 15 to enter the nozzle 10 when the piston 28 and rod are displaced in the direction of arrow A from a maximum distance, to prevent solder entering and setting in the nozzle. A conically wound, biasing compressing spring 29 is trapped between the piston and the end plug 13.

The barrel has one or more passages 30 adjacent the end plug 15 to allow egress and ingress of air behind the piston, and a shield 26 may be provided to protect the hand of the user when the spring drives the rod to the illustrated position, this feature being particularly useful when a powerful spring is used which drives the piston rod at high speed when the latch member is released.

As the rod is displaced in direction A, from its initial position toward a selected adjusted position, the cross-pin 19 is urged by the soft spring into the gaps 16. The displacement is continued until the appropriate one of the gaps is so engaged, and it will be found that in continued movement the latch member 24 reciprocates in the plug 15 as the cross-pin 19 rides from one gap to the next. It will be understood that the displacing movement against the spring and in the direction of the arrow A is terminated in one of these positions, according to the degree of suction required.

Release is effected by manual displacement of the latch member to take the cross-pin clear of the rod whereupon the piston is returned to its initial position, as shown in FIG. 1, which the spring 29 is substantially unstressed.

Turning now to FIG. 2, the tool shown therein is generally similar to that in FIG. 1 but differs in three important respects.

Firstly the barrel has a row of exhaust ports or holes 40, 42, 44 (although less or more may be provided). Secondly a seal band 46 surrounds the barrel and closes off, in the illustrated case, selected holes 40, 42. Thirdly, the piston rod has only a single stop face 18, gap 16 and cam 20. Hence the actual stroke of the piston in movement from its initial position as shown in FIG. 2 to the detent engaged position is always the same.

However, when the piston passes hole 44 in its spring driven travel, the suction effect at nozzle 10 is rendered ineffective. In this instance this makes for minimum suction.

By positioning the band 46 to close off hole 44 only a greater suction value is provided because a longer portion of the stroke is effected. By closing holes 44 and 42 even more suction value is provided, and a maximum where all three holes are closed. Thus, although the actual stroke or travel of the piston in each instance is the same, the effective, or suction generating, stroke is variable depending on which of the holes are closed.

It will be appreciated that there may be more than three holes: and/or there may be a group of circumferentially spaced holes at each axial position.

The seal band could be sealed or adhered to the barrel as a fixture, for example in manufacture or made slidable to allow adjustment by the user.

Having now described my invention what I claim is:

1. A suction pump comprising a barrel having two ends; a nozzle at one of said ends; a sealing piston slideably accommodated in said barrel for movement axially thereof; a rod connected to said piston for moving the latter axially of said barrel from an initial position to an adjusted position between the ends of said barrel; biasing means acting on said piston for returning said piston from said adjusted position to said initial position at a velocity and through a distance sufficient to effect the generation of suction through said nozzle; and means for varying the value of the suction generated in response to said movement of said piston, said biasing means being substantially unstressed when said piston is in said initial position.

2. A suction pump according to claim 1 including releasable latch means for latching said piston in said adjusted position.

3. A suction pump according to claim 2 wherein said latch means comprises a latch member operable releasably to engage said piston rod and overcome said biasing means.

4. A suction pump according to claim 2 wherein said latch means comprises at least one notch in said piston rod and a latch member movable into and out of said notch.

5. A suction pump according to claim 1 wherein said means for varying the value of the suction comprises latch means for releasably latching said piston in any selected one of a number of different adjusted positions axially spaced from said nozzle, thereby enabling the distance between said initial position and the selected one of said adjusted positions to be varied.

6. A suction pump according to claim 1 wherein said means for varying the value of the suction comprises at least one port in said barrel between said initial and adjusted positions of said piston, and means for selectively opening and closing said port.

7. A suction pump according to claim 1 wherein said means for varying the value of the suction comprises a plurality of axially spaced ports in said barrel between said initial and adjusted positions, and means for selectively opening and closing said ports.

8. A suction pump comprising an elongate barrel having first and second ends; a nozzle at one end of said barrel; a sealing piston slideably accommodated in said barrel for movement axially thereof; a piston rod extending through the other end of said barrel and connected to said piston for moving said piston axially of said barrel from an initial position adjacent said other end to an adjusted position; biasing means urging said piston to move in a direction away from said nozzle from said adjusted position to said initial position at a velocity sufficient to generate suction through said nozzle; and releasable latch means cooperable with said piston rod to latch said piston in any selected one of a number of different adjusted positions between the ends of said barrel, thereby enabling the value of suction generated in response to movement of said piston to said initial position by said biasing means to be varied, said biasing means being substantially unstressed when said piston occupies said initial position.

9. A suction pump according to claim 8 wherein said releasable latch means comprises a plurality of longitudinally spaced notches in said piston rod, and a movable latch member movable into and out of any selected one of said notches.

10. A suction pump according to claim 9 including spring means yieldably urging said latch member in a direction toward said piston rod.

11. A suction pump according to claim 8 including an exhaust passage through said barrel at said other end thereof.

12. A suction pump comprising an elongate barrel having first and second ends; a nozzle at one end of said barrel; a sealing piston slideably accommodated in said barrel for movement axially thereof; a piston rod extending through the other end of said barrel and connected to said piston for moving the latter axially of said barrel from an initial position adjacent said other end to an adjusted position; biasing means urging said piston to move from said adjusted position to said initial position at a velocity sufficient to generate suction through said nozzle; releasable latch means for releasably latching said piston in said adjusted position, said barrel having a plurality of axially spaced ports therein between said adjusted position and said other end of barrel and past which ports said piston may move as it moves from said adjusted position toward said initial position; and means for opening and closing a selected number of said ports, thereby enabling the value of suction generated in response to movement of said piston toward said other end of said barrel by said biasing means to be varied.

13. A suction pump according to claim 12 wherein said barrel has an exhaust port adjacent said other end.

14. A suction pump according to claim 12 wherein said releasable latch means comprises a notch in said piston rod and a movable latch member movable into and out of said notch when said piston is in said adjusted position.

15. A suction pump according to claim 12 wherein said biasing means is substantially unstressed when said piston is in said initial position.

* * * * *

UNITED STATES PATENT AND TRADEMARK OFFICE
CERTIFICATE OF CORRECTION

PATENT NO. : 5,187,833
DATED : February 23, 1993
INVENTOR(S) : Zdzislaw Bieganski It is certified that error appears in the above-identified patent and that said Letters Patent is hereby corrected as shown below:

Column 1, line 14, change "latching" to -- latch in --; line 16, change "sized" to -- sizes --; line 23, change "objects" to -- object --; line 26, change "intention" to -- invention --.

Column 2, line 6, change "15" to -- 25 --; line 10, change "compressing" to -- compression --; line 33, after "1," insert -- in --; line 45, change "detent" to -- latch --.

Signed and Sealed this

Twenty-eighth Day of December, 1993

Attest:

BRUCE LEHMAN

*Attesting Officer*  *Commissioner of Patents and Trademarks*